Oct. 7, 1924.
H. A. HOUSE
LINK BELTING
Filed Sept. 27, 1923
1,511,037
2 Sheets-Sheet 2
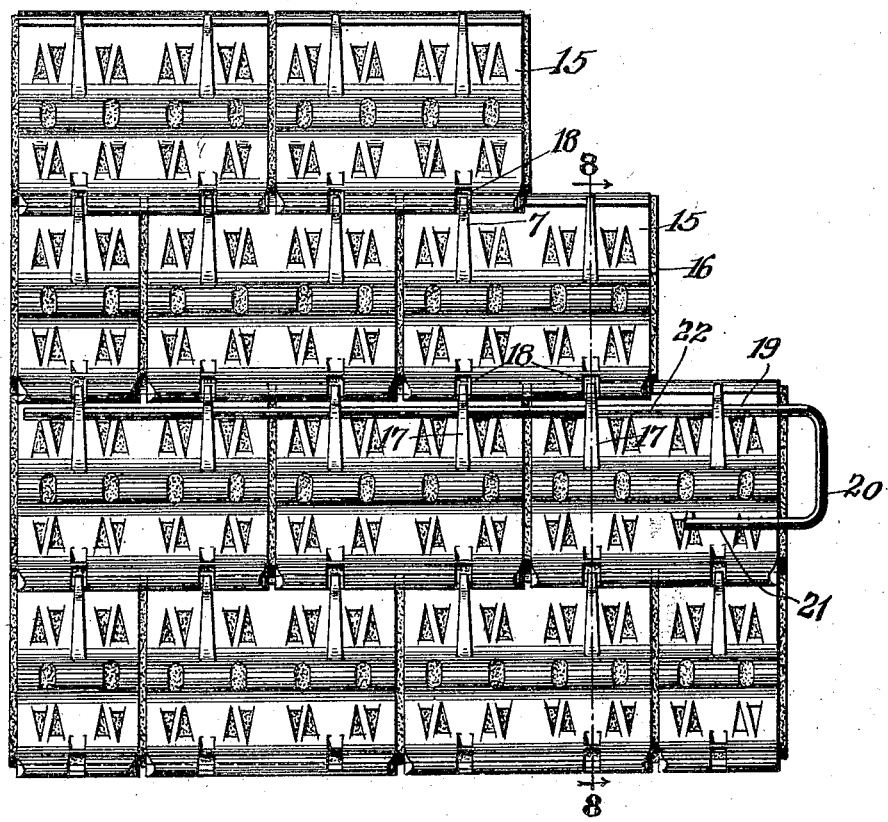
*Fig. 7.*
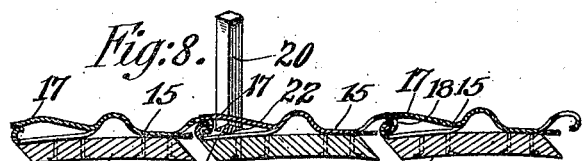
INVENTOR
Henry A. House
BY C. P. Goepel
ATTORNEY Patented Oct. 7, 1924.

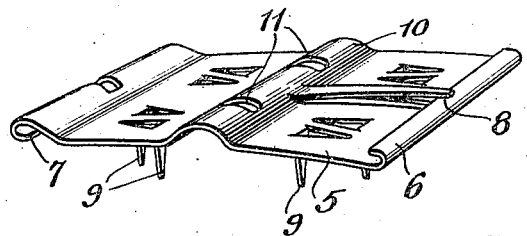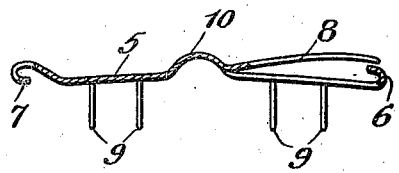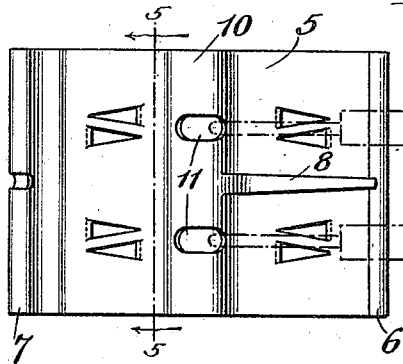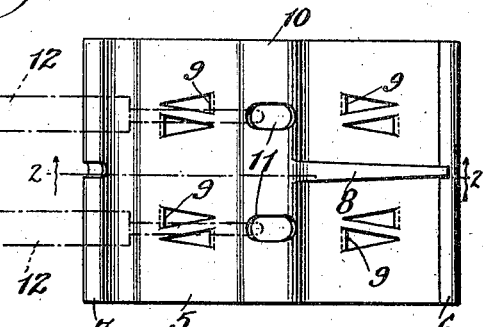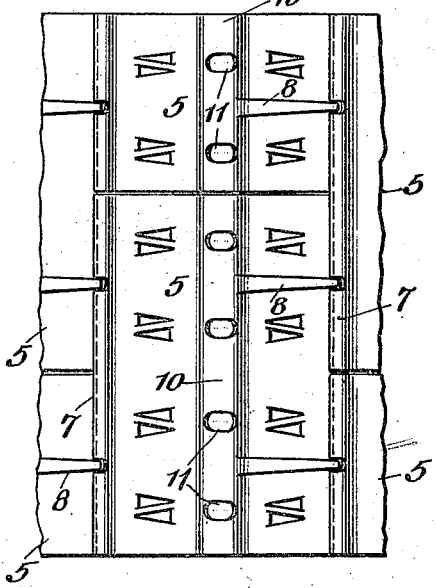

1,511,037

UNITED STATES PATENT OFFICE.

HENRY A. HOUSE, OF BRIDGEPORT, CONNECTICUT.

LINK BELTING.

Application filed September 27, 1923. Serial No. 665,071.

*To all whom it may concern:*

Be it known that I, HENRY A. HOUSE, a citizen of the United States, and a resident of Bridgeport, county of Fairfield, and State of Connecticut, have invented certain new and useful Improvements in Link Belting, of which the following is a specification.

This invention relates to link belting, such for instance as that shown and described in my prior application for patent, Serial No. 595,036, filed October 17, 1922. As shown in said application, the belting is composed of a plurality of composite units, each consisting of a sheet metal plate and a friction member fixed to one side thereof, said plates being provided at their opposite ends with means for flexible interlocking connection with each other.

It is the primary object and purpose of my present improvements to provide the sheet metal link plates with means which will permit of a longitudinal yield of the individual plates to compensate for unequal strains thereon and to also obviate the possible bending or distortion of the flexibly connected end portions of the link plates.

In one embodiment of my present improvements, I provide each of the sheet metal link plates in the central portion thereof with a transversely extending yieldable arch or bend. Thus when the link plate is subjected to excessive longitudinal pull or strain, this arch will tend to yield and flatten out so that the link plate will be longitudinally distended or lengthened. Immediately upon the release of the excessive strain, said transverse arch will return to its normal condition.

It is another object of the invention to provide the transverse arch portion of each link plate with suitable means whereby turn buckles or other equivalent devices may be readily connected to the end plates of the belt for the purpose of drawing the same together and flexibly connecting the ends of said plates to each other.

Another object is to provide a composite unit, having a single web with a plurality of metallic links thereon, of single or multiple form; another object is to provide the links with a plurality of staggered prongs made integral with the links.

With the above and other objects in view, the invention consists in the improved belt link and in the form, construction and relative arrangement of its several parts, as will be hereinafter more fully described, illustrated in the accompanying drawing and subsequently incorporated in the subjoined claims.

In the drawings wherein I have illustrated one simple and practical embodiment of my present improvements and in which similar reference characters designate corresponding parts throughout the several views:

Figure 1 is a perspective view of one of the link plates;

Figure 2 is a longitudinal section taken on the line 2—2 of Figure 3;

Figure 3 is a top plan view showing the end link plates of a belt and the manner in which they may be connected to each other;

Figure 4 is a bottom plan view of one of the link plates;

Figure 5 is a transverse section taken on the line 5—5 of Figure 3;

Figure 6 is a plan view showing a plurality of link plates of relatively different widths as assembled in the belt structure;

Figure 7 is a plan view showing a section of the belt composed of interlocked link plates each consisting of a web and a plurality of units;

Figure 8 is a sectional view taken on the line 8—8 of Figure 7;

Figure 9 is a similar view;

Figure 10 is a detail perspective view of the tool preferably used in the assembling or disassembling of the units; and Figure 11 is an enlarged cross-sectional view thereof.

Similar reference characters designate corresponding parts throughout the several views:

As in my co-pending application for patent above indentified, the sheet metal link plate 5 is slightly curved longitudinally and at its opposite ends is formed with the reverse bends 6 and 7 respectively, for interlocking connection with similar bends of adjacent link plates, in the manner fully disclosed in my prior application. The link plate is further provided with the spring locking tongue 8 for retaining the flexibly connected plates in assembled relation and also has a plurality of spurs 9 struck from the body of the plate adjacent its opposite ends which are adapted to be clinched through a friction member of leather, cork or other suitable material arranged upon the concave side of the plate.

One novel subject matter of the present disclosure consists in providing in the central portion of each link plate 5, a transversely extending arch 10 projecting above the convex or outer face of the plate. This arch extends across the full width of the link plate and in spaced relation to each end thereof the arched portion of the plate is provided with an opening 11, the purpose of which will be presently explained.

When the sheet metal link plates have been flexibly connected with each other in the manner illustrated in Figure 6 of the drawing to form a continuous belt, in the use of the belt, it frequently happens that the link plates will be subjected to unequal longitudinal pull or strain, and if these plates are incapable of yielding to such excessive strains, the possibility exists that the flexibly connected ends 6 and 7 of the plates may be distorted so that the plates will not properly flex relative to each other, or even become disconnected. The provision of the transverse arches 10 in the link plates obviates the possibility of such an occurrence and permits of an independent longitudinal yield or spring action in each link plate so that in response to the excessive strain or pull the link plate will be longitudinally distended or lengthened. However, once the plate is relieved of such excessive strain, the arch portion 10 thereof will immediately return to its normal condition.

It is sometimes necessary to lengthen or shorten the belt, and in such cases additional belt units are inserted or some of the belt units removed. In order to connect the ends of the belt without removing the same from the shaft pulleys it is necessary to apply pulling or stretching devices. Such devices I have indicated in Fig. 3 in the form of conventional turnbuckles 12. In applying the same the turnbuckle rods which have suitably formed hooks at their ends are engaged in the openings 11 in the arched portions of the end link plates of the belt. The turnbuckle sleeves are then rotated so that the end links are forcibly drawn together and the plates 5 interlocked with each other. In effecting this connection the arched portion 10 of the link plates permits of the plates yielding to the strain or pull so that by inserting or removing link units of different lengths, it is possible to secure the proper frictional bearing of the friction members of the belt units upon the faces of the shaft pulleys, and thereby obviate slipping of the belt and insuring a positive drive.

I also have shown a section of a belt composed of metal link plates 15 upon one side of which a web of leather or other suitable friction material 16 is suitably secured. A series of these plates of the same or of relatively different widths are secured upon a continuous strip of the friction material web. Flexible interlocking means between the link plates is fully shown and described in my co-pending application for patent, Serial No. 595,036, filed October 17, 1922, and constitutes no essential feature of the present invention and it will not be herein described in detail. It will suffice to state that these link plates are held in flexibly interlocked relation to each other against possible accidental disconnection by means of longitudinally extending spring tongues 17 struck from each plate, the free ends of which are adapted for engagement in notches or recesses 18 of an adjacent plate or plates.

In this improved form of link, each link is provided with a plurality of clinching prongs 9, arranged in staggered relation which secure the links to the web. These prongs are preferably made integral with the links.

To readily assemble and disassemble the composite webs and links, I provide a tool in the form of an elongated rod or bar 19, one end of which is formed into a loop or bend 20 having an extremity 21 extending in parallel relation to the body of the bar and providing a suitable handle. This bar or rod in cross-section is of equilateral form, preferably, diamond shaped, as shown in Figure 11 of the drawings and in planes at right angles to each other is of relatively different dimensions. Preferably, the longer axis is approximately twice the length of the shorter axis.

In the use of the tool, the rod or bar 19 is inserted transversely across the belt between the locking tongues 17 and the surfaces of the link plate 15, the longer cross-sectional dimension of said rod being parallel with the plane of the link plate and the bent or looped end of the rod is now grasped and said rod turned to engage the side edges or apices 22 of said rod with the spring tongues 17 and the link plates 15, respectively. As the rod is turned to the position seen in Figures 7 and 9 with its longer cross-sectional dimension at right angles to the plane of the link plate, the free ends of the spring tongues 17 will be lifted from the notches or recesses 18, said rod being retained in such position by contact of the extremity 21 thereof with one of the link plates and the bearing pressure of the spring tongues upon the edge 22 of the rod. The interlocked link plates can now be readily disconnected from each other by shifting one series of plates transversely of the other, as will be readily understood from an inspection of the drawing. When the link plates are again connected, upon lifting the end 21 of the rod 19, the spring tongues 17 will return to their effective positions and lock the adjacent series of plates against relative transverse shifting movement. The rod 19 is then withdrawn from beneath the locking tongues.

From the foregoing description considered in connection with the accompanying drawings, the nature of my present improvements and the several advantages thereof will be clearly and fully understood. While the device is of a very simple character, I have found that increased utility and greater efficiency in the use of a belt of this description is thereby obtained. As indicated in Figure 6 of the drawing, it is possible by providing the link plates of different widths to connect the same and form a belt of any required width. I have herein disclosed one practical and satisfactory embodiment of the present improvements. However, it will be understood that the detail features referred to are susceptible of considerable modification and that the invention might be embodied in other alternative constructions. Accordingly, I reserve the privilege of resorting to all such legitimate changes in the form, construction and relative arrangement of the several parts as may be fairly embodied within the spirit and scope of the invention as claimed.

I claim:

1. A link belt unit consisting of a sheet metal plate having means at its opposite ends for flexible connection with a similar plate and formed intermediate of its ends with additional means resiliently yielding to excessive longitudinal pull or strain upon the link plate.

2. A link belt unit consisting of a sheet metal plate having means on its opposite ends for flexible connection with a similar plate and also provided intermediate of its ends with a transversely extending resiliently yielding arched portion permitting of the lengthening or longitudinal distention of the plate under excessive strain or pull.

3. A link belt unit consisting of a sheet metal plate having means on its opposite ends for flexible connection with a similar plate, said plate being further provided with an arched portion extending across the entire width of the plate and resiliently yielding to excessive longitudinal strains or pull upon said plate in either direction.

4. A link belt unit consisting of a sheet metal plate having means on its opposite ends for flexible connection to a similar plate, said plate being also centrally provided with a transverse arch extending across the entire width of the plate and having an opening therein to receive a part of a link connecting device.

5. A link belt unit consisting of a sheet metal plate having means at its opposite ends for flexible connection with a similar plate and formed intermediate of its ends with additional means resiliently yielding to excessive longitudinal pull or strain upon the link plate and having on either side of said additional means a plurality of staggered arranged prongs.

6. A link belt unit consisting of a sheet metal plate having means at its opposite ends for flexible connection with a similar plate and formed intermediate of its ends with additional means resiliently yielding to excessive longitudinal pull or strain upon the link plate and having on either side of said additional means a plurality of staggered arranged prongs, and a web secured by said prongs to the sheet metal plate.

7. The combination of a plurality of link belt units each consisting of a sheet metal plate having means at its opposite ends for flexible connection with a similar plate and formed intermediate of its ends with additional means resiliently yielding to excessive longitudinal pull or strain upon the link plate, said sheet metal plates being of the same or different widths, and a common member secured to each of said plurality of sheet metal plates for forming a composite unit of sheet metal plates, adapted to be used in its entirety as a link belt unit.

8. The combination of a plurality of link belt units each consisting of a member having one or more sheet metal plates secured thereto, and each plate having a resilient central web and means securing the plates to the member, and means on the plates for assembling or disassembling the plates to or from adjacent plates, whereby the several units may be assembled or disassembled.

In testimony that I claim the foregoing as my invention, I have signed my name hereunder.

HENRY A. HOUSE.

Witnesses:
R. E. House,
L. Hansen.